United States Patent [19]
Heilman

[11] Patent Number: 5,383,491
[45] Date of Patent: Jan. 24, 1995

[54] DUAL TANDEM FLOW DIVERTER VALVE SYSTEM

[76] Inventor: David D. Heilman, 45 Tulip Ct., Geneseo, Ill. 61254

[21] Appl. No.: 183,414

[22] Filed: Jan. 19, 1994

[51] Int. Cl.⁶ ............................................. F16K 11/076
[52] U.S. Cl. ..................................... 137/597; 137/545
[58] Field of Search ............ 137/597, 599.1, 625.29, 137/545

[56] References Cited

U.S. PATENT DOCUMENTS

| | | | |
|---|---|---|---|
| 825,507 | 7/1906 | Bayley | 137/625.29 |
| 1,593,300 | 7/1926 | Harwood | 137/625.29 |
| 2,500,239 | 3/1950 | Beyette | 137/597 |
| 3,618,781 | 11/1971 | Brown | 137/545 X |

*Primary Examiner*—Stephen M. Hepperle
*Attorney, Agent, or Firm*—John P. Halvonik

[57] ABSTRACT

The invention is a dual tank dispensing system that provides for directional control of the fluid being dispensed. Flow may be diverted through various pathways in order to provide different flow modes including: normal delivery, backwashing, rinsing, and isolation of one of the tanks. A unique dual diverter valve unit provides for alternate flow arrangements through passages in a body that connect the two tanks to the source of water. Each valve is in connection with four passages and through rotation of these valves various pathways are created that lead the flow to be diverted through one or both tanks and through an outlet passage leading to the destination or through one of two passages that allow for either rinse or backwash. A detector may be used in connection with the control unit to determine that the filters are clogged and signals the system to being a backwashing operation. The control unit rotates one or both valves a certain degree that changes the direction of flow and allows a reverse flow through one of the tanks. Other movements of the valves may be used to direct the flow normally through the tank but not to the final destination (rinse mode) and/or shutting off flow to one tank entirely (disconnect mode).

6 Claims, 5 Drawing Sheets

DUAL TANDEM FLOW DIVERTER VALVE SYSTEM

BACKGROUND OF THE INVENTION

The invention relates to the field of dispensing and, in particular, to dispensing systems that have a pair of intermediate filtering tanks that provide a filtering means for the liquid as it makes its way to a final destination, which may be e.g. domestic usage, pool water, etc. In such systems each tank acts as a separate filter so that one of the tanks may be periodically removed from the system without having to interrupt the supply of water as the other tank is used in its place.

Periodically, particles tend to build up on the filter which necessitates that the filter be backwashed (i.e. normal flow through the filter be reversed) in order to clean the filter. It is such a step that the applicant's invention provides on an automatic basis and also on an as-needed basis when used with an external differential pressure sensor. Periodically, it may also be necessary to cut off the flow entirely from one of the tanks in order to disconnect that tank for repair, replacement, etc. In that situation, the flow through the passages may be diverted in order to direct flow entirely through the other tank and not to the one being repaired.

DESCRIPTION OF THE PRIOR ART

While there are dual tank systems that for filtering liquid prior to its final destination, none that applicant is aware of provide for automatic control of steps for backwashing and rinsing the tanks on a periodic basis.

SUMMARY OF THE INVENTION

A valve body having eight entrance passages connects the tanks to a liquid supply. Four of the passages are for entry and exit of liquid trough each tank. One of the passages is the main entrance form the source of liquid and other is for the exit of the liquid to the ultimate destination. The other two passages are for discharge in either the backwash or rinsing modes of operation. A pair of flow diverter valves are fixed for rotation inside the valve body. Each diverter valve is in connection with four of the passages in the valve body. In addition to the entrance passages a central bore runs through the body in order to connect each diverter valve to its own drive shaft in connection with the controlling means.

In operation, a central controller operates on a time basis to periodically go through backwash and rinse operations on alternate tanks. When such a step is necessary the controller rotates one or both of the valve diverters in order change the normal flow of liquid through the tanks and the passages so that the flow through one of the tanks may be reversed for backwash of the filter.

It is an object of the invention to provide a dual tank filter system having flow diverting mechanism for reversing the flow of liquid through either one of the tanks to provide a backwashing operation.

Another object of the invention is to provide a system that provides for the automatic back washing of filters as the filters become clogged.

Another objective is to provide a dual tank filter system with automatic control of modes of operation including the backwashing, rinsing and disconnecting the tanks.

Yet another objective is to provide a dual tank filter system with sealing arrangements that prevent the buildup of particles inside the valve passages.

Other objectives of the invention will become apparent to those skilled in the art once the invention has been shown and described.

DESCRIPTION OF THE PREFERRED EMBODIMENT

Figure 2:
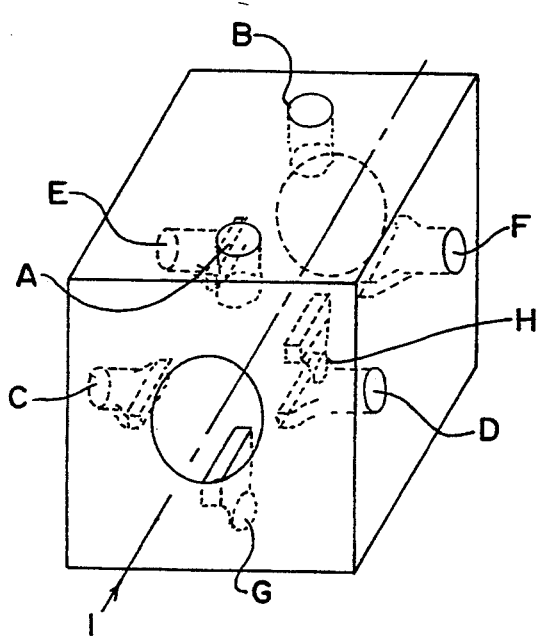
FIG. 2 Valve body construction.
Figure 5:
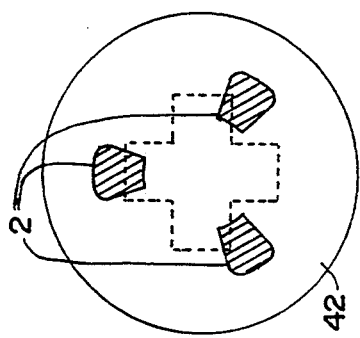
FIG. 5 End view of outlet diverter.
Figure 6:
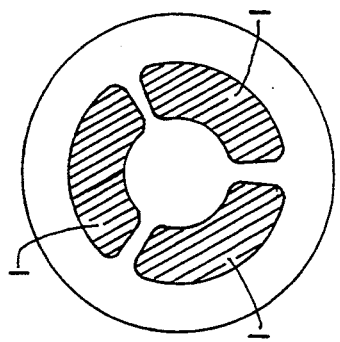
FIG. 6 View of inlet diverter and lugs.
Figure 3:
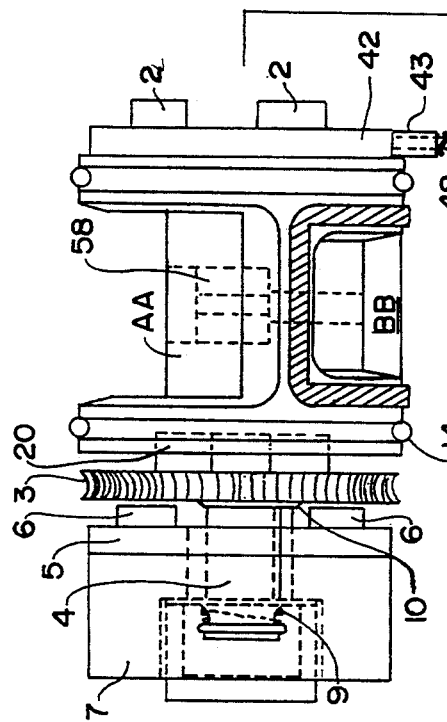
FIG. 3 Side view of inlet diverter and drive assembly.
Figure 4:
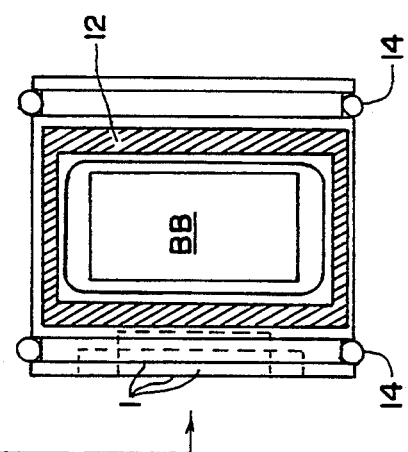
FIG. 4 Side view or outlet diverter.
Figure 8:
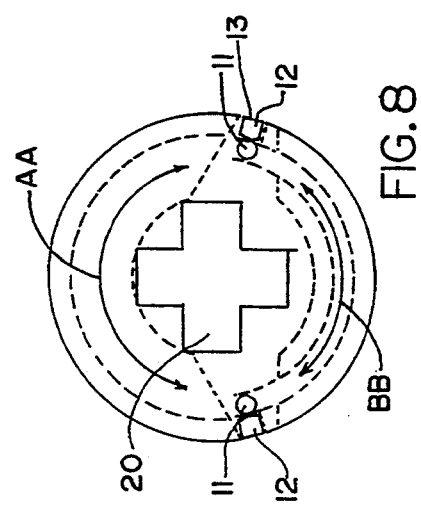
FIG. 8 Side view opposite FIG. 6.

The overall construction of the valve body is shown in FIG. 2. The top passage A is for the inlet of liquid (for both tanks) and the other passage B is for the outlet of liquid from either or both tanks. Both of these are located on the top surface of the block. The bottom passages G and H allow for outlet of water in either the rinse or backwashing modes. The four passages C, D, E, and F on the sides of the body allow for entrance and exit of water to each of the tanks thus, there are four of these, two passages for each tank including an exit and outlet for both. Passage C is the outlet for tank 1, F is outlet for tank 2. Passage E. is inlet for tank 1, D is inlet for tank 2.

Any or all of the passages may be constructed so that they taper in the direction toward the inside of the valve body so that the openings AA and BB of the diverter valve need only be of minimum size in order to cover the smaller passageway. It is preferred that these passageways be located approximately 90° apart on the valve body as seen in FIG. 2. Other positions are possible without varying from the spirit of the invention. For instance, if the ports are smaller in size, a smaller rotation of the diverter may be sufficient to connect the ports that need to be connected for that particular mode.

Figure 12A:
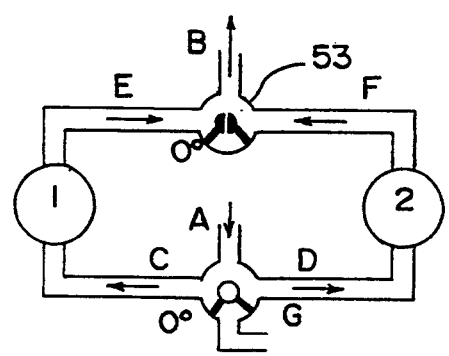
FIG. 12A–C Three basic flow patterns.

The two diverter valves 20 and 30 are located inside the center of the valve body and are shown in detail in FIG. 3–6 and 8. Each diverter is of similar construction, both having a removed portion on the upper and lower portions of the cylindrical valve. The upper removed portion is designated AA and the lower removed portion designated BB. The upper removed portion is about 200° of the circumference of the diverter and the lower removed portion is about 135° of the divereter circumference. These portions allow the various passages A–H of the valve body to be connected to one another in various patterns so that different flow patterns may be obtained. Again if the ports are smaller in diameter, the removed portions may be smaller in size and still be able to cover the ports effectively. For example. ports A and C and D may be relatively close to one another and may be unconnected as in FIG. 1A by a less than 200° removed portion. There may be a central passage 58 (see FIGS. 12A and 3) leading through the center of one of the diverters and connecting the two removed portions AA and BB to one another.

The size of the angle of the the removed portion will vary with the size and diameter of the central bore and port area. The valves may be connected to one another through the use of lugs 2 in the outside of one of the diverters. The lugs would connect with apertures 1 in the side of the other diverter. Thus the diverters can be connected to move together in a basic embodiment, although they may be connected so that they are out of phase in preferrred and alternate embodiments. I.e. the removed portions may not be aligned with one another, they may be positioned out of phase in relation co one another. In this way, the diverters may be rotated by only one drive means. While both diverters are similar in construction, they are each in connection with different inlet openings.

It is also possible to have two separate drive means controlling the diverters. One way to do this would be by using two concentric shafts to operate the diverters. I.e. the inlet diverter may be operated by one shaft (hollow inside) and the outlet diverter may be operated separately by a shaft running through the center of the inlet diverter shaft. Each shaft would have its own drive gear and drive motor contained in a central controller.

The inlet diverter 20 is on one side of the interior passage seen in FIG. 2 so that it is in connection with the main inlet passage A as well as tank inlet passages C and D and the backwash outlet G. Note that these letter designations for the inlets/outlets correspond to those passages shown in FIG.2. The outlet diverter 30 is on the other side of interior passage and connects passages B, E, F, and H, see FIG. 1 for diagrammatic representation of these.

In normal operation (see FIG. 1G), the removed portion AA of this diverter connects the main inlet A with the two tank inlets C and D. Water (or other liquid) that goes to each tank is filtered and comes out of each of the tank outlet passages. The outlet diverter is positioned adjacent the inlet diverter so that the removed portion of the outlet diverter will connect the tank outlet passages E and F to the main outlet B and water then flows from the tanks to the ultimate destination (connected to the outlet passage B).

Figure 1A:
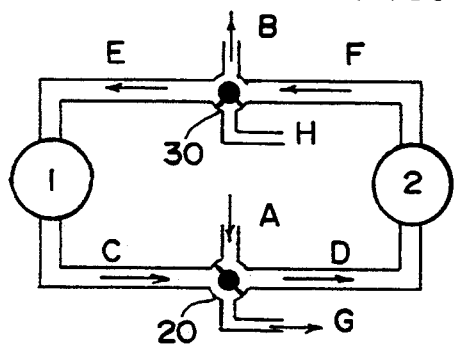
FIG. 1A–G Basic flow patterns for various modes of operation.

In the backwash mode (FIG. 1A and/or 1D), the inlet diverter is rotated so that only one of the tank inlet passages (TIP) (that of the tank not being backwashed) is connected through AA to the main inlet opening and the other tank inlet opening is connected to the backwash outlet through BB. In FIG. 1A, inlet D remains connected to the main inlet A while inlet C is connected to the backwash outlet G through the lower passage BB.

Figure 1B:
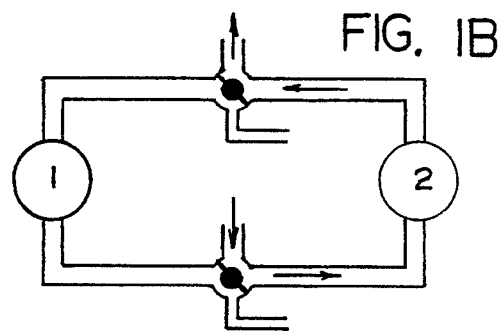

Note: the back wash outlet does not connect to the destination. It may be connected to another container for removal of dirt, etc. or may simply outlet on the ground. The outlet diverter is also rotated so that one of the tank outlet passages (TOP) (that tank not being backwashed) is connected to the other tank outlet passage. In FIG. 1A this means that outlet F is connected to outlet E, E is now functioning as an inlet for tank 1 instead of its usual outlet function as in FIG. 1G. FIG. 1D shows a similar operation the flow reversed i.e. tank 2 being backwashed and the inlet diverter valve being in a different position.

Thus in the backwash modes, the water comes in through the main inlet and is sent to one of the tanks (that not being backwashed) in the normal direction. This flow then leaves that tank and a regulated portion of flow returns to the other tank (that being backwashed) in a direction opposite the normal flow direction. The reverse flow cleans out the filter and this dirt, etc. flows out the tank inlet passage and exits through the backwash passage by virtue of the position of the inlet diverter valve. See FIG. 1A and 1D.

Figure 1C:
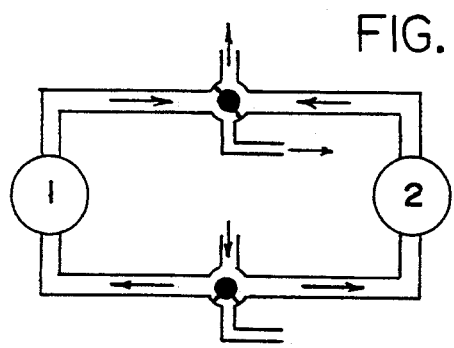
Figure 1D:
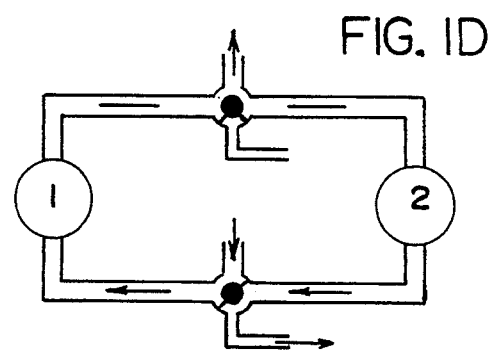
Figure 1E:
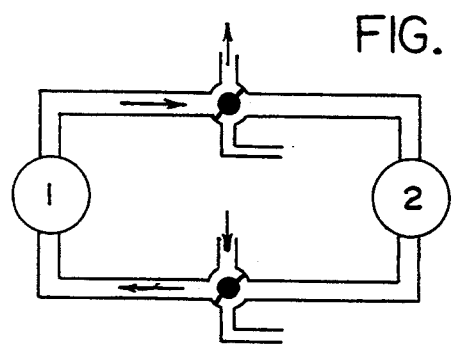
Figure 1F:
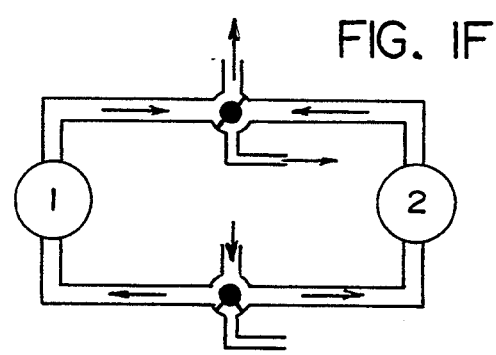
Figure 1G:
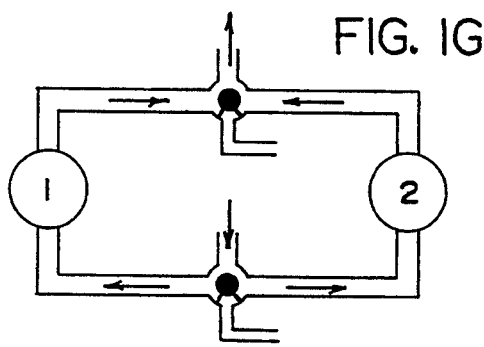

In the rinsing mode FIG. 1C and 1F, the inlet diverter is in normal mode and flow enters the tank inlet passage C and D in the usual direction. The outlet diverter is rotated about 30° so that removed area BB connects to the outlet passage H to outlet E. The outlet diverter would then be rotated in the negative direction (i.e. −30° in this example) in order to rinse the other tank. The inlet diverter remains in the same position throughout both operations, in fact the same position as in the normal mode.

In the isolation mode FIG. 1B and 1E, the inlet diverter is rotated so that the main inlet flow goes to the TIP (either C or D) for that tank not being isolated and the other TIP receives no flow. The outlet diverter rotates so that the TOP (either E or F) of that tank not being isolated remains in connection with the main outlet and the TOP of the tank being isolated does not connect with the main outlet (it is likely to be connected to the rinse outlet allowing the tank to depressurize). The diverters are rotated in opposite directions to isolate the other tank i.e. if they were rotated 60° to isolate tank one they would rotate −60° to isolate tank two. In this mode, that tank that is isolated can be removed from this system without affecting the flow.

In an alternate embodiment, the system may be modified slightly for use with brine reservoirs in a water softener system, see FIG. 11. Each filter tank is a separate water softening system for removing minerals out of water. Again, the water may be from any source e.g. well, etc. and is inlet at the main inlet A .

Figure 7:
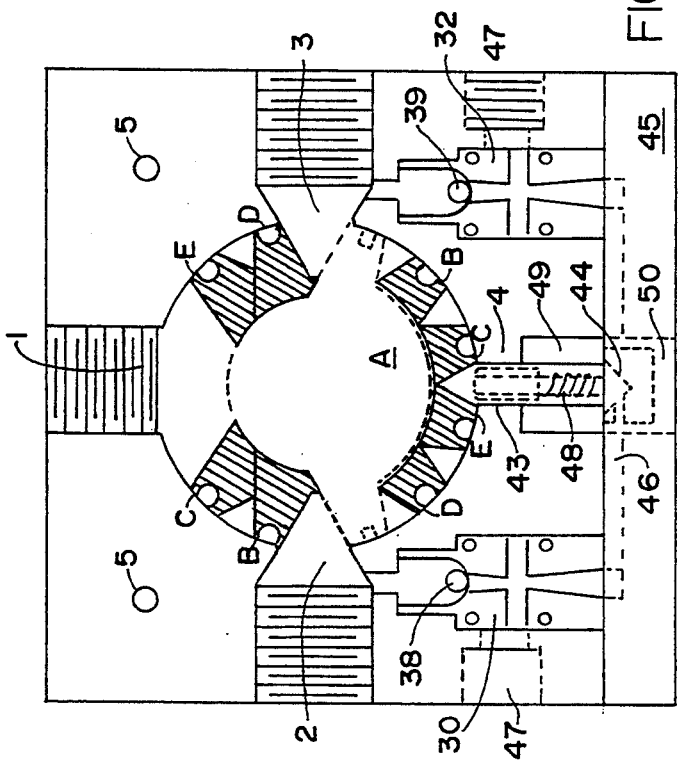
FIG. 7 Front of valve body in relation to ports.

A brine solution is then used periodically to clean the resin matrix that act as the filter means inside the tanks. The dissolved ions of the brine solution exchange with minerals such as Calcium, magnesium etc. that are held in the matrix. After such exchange the sodium and chloride ions may be washed from the matrix and the matrix and in this manner the resin matrix is cleaned for reuse. Similar type process steps are carried out as before with a backwash step identical to that previously described. There are two additional rinse steps, slow rinse and fast rinse which resemble the previous rinse step but is not identical. The slow rinse step includes brine taken up from one of the brine resevoirs 34, 35. This is drawn up by a pump in conjunction with an air check valve at 36. Brine wash is taken up at port 47 (FIG. 7A) by the suction pulling effect of the eductors 30 and 32.

The first eductor line 30 is in connection with the outlet F of tank 2 and the inlet C of tank 1. The second eductor 32 is in connection with the inlet D of tank 2 and the outlet E of tank 1. One way valves 38 and 39 are used at the point where the brine enters the eductor line to prevent reverse flow through the eductor during normal operation. A passage 50 may be used to connect both ports G and H for better removal of back wash. The valve 44 may used in connection with this passage see FIG. 11A etc.

Figure 11A:
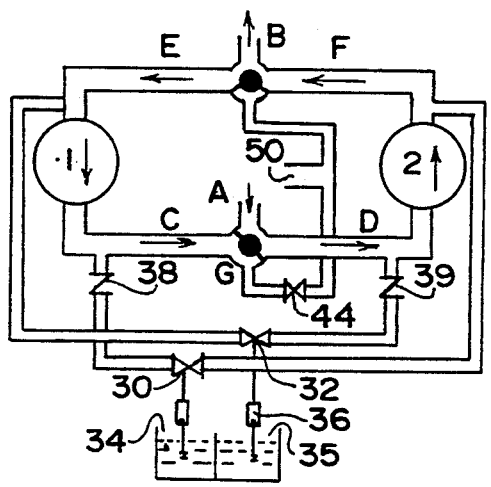
FIG. 11 A–G Flow patterns with detailed passages.
Figure 11B:
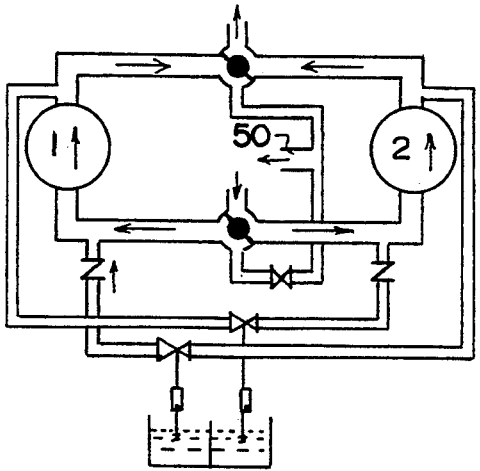
Figure 11C:
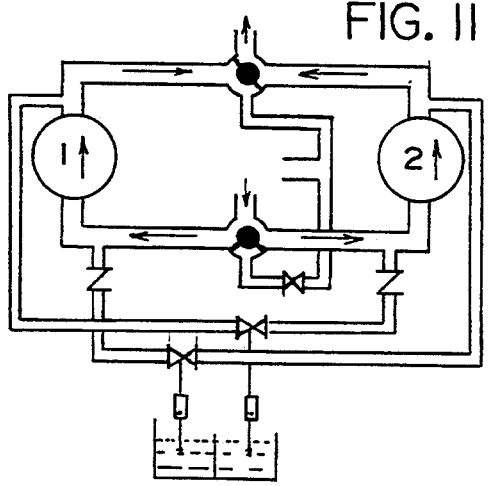
Figure 11D:
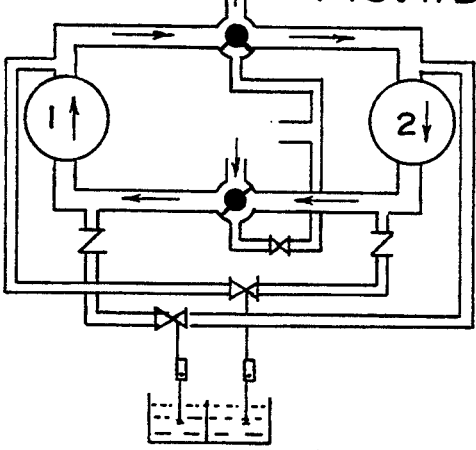
Figure 11E:
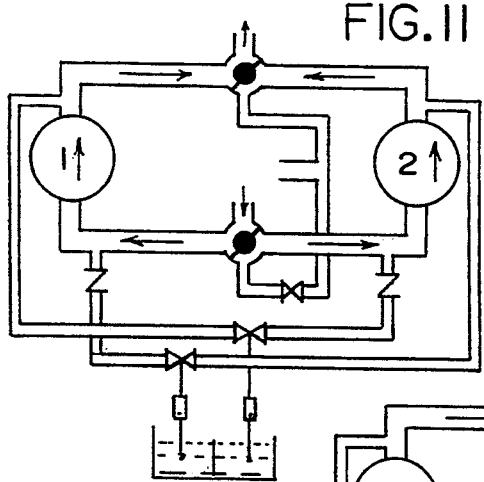
Figure 11F:
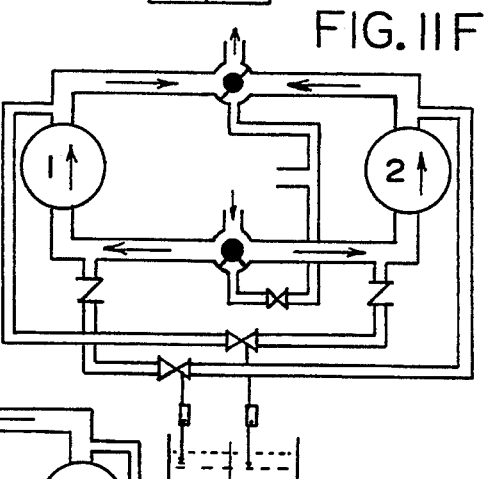

When it is desired to clean the resin bed in tank 1 the backwash step is done first, same as before see FIG. 11A. Then a slow rinse is done with the valves in position akin to that for the isolation step described in the first embodiment, see FIG. 11B. The brine solution is drawn up through air check valves 36 which then enters venturi at 47 and injects at C of tank one. Usually there is a one to two ratio of water (from tank 2) to brine (from the reservoir).

The back wash control valve 44 is closed during 11B and 11E brine/slow rinse to prevent brine from escaping at waste port 50 (see FIG. 11). A hose may be connected to that port 50 (as well as G and H if manifold 45 is not used) to aid in directing the waste stream. Valve 44 is operated by a diverter mounted cam 42 (see FIG. 3 and 6). Sleeve 43 rides against cam 42 which selectively compresses spring 48 to seat valve at porting manifold 45. Channels 46 in manifold 45 connect venturis 30 and 32 to driving water supplies and provide connection path between backwash and rinse ports via backwash control valve to a single waste port 50.

The slow rinse of brine exchanges the NaCl ions in the brine with ions trapped by the resin bed in the tank. This leaves Na and Cl ions in their place. The tank is then fast rinsed in a manner similar to the rinse step described in the first embodiment, see FIG. 11C. No brine solution is used and the fresh water from main inlet washes the Sodium Chloride off of the matrix.

Figure 11G:
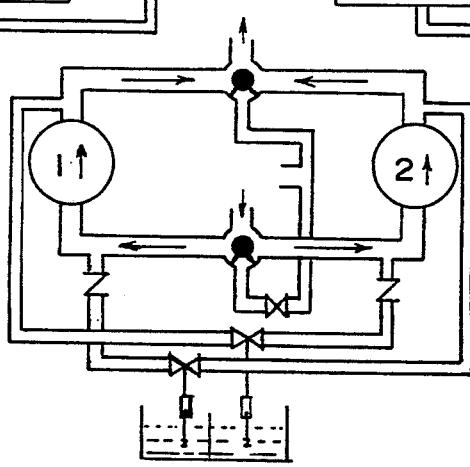

The same process may be used to clean the matrix of tank 2 with the eductor line 32 being used to draw the brine solution in during the slow rinse step. Again the steps are similar to those described in the first embodiment, see FIG. 11D-F. Eventually both tanks may be returned to service by normal configuration of the valves as shown in FIG. 11G.

A more basic process is shown in FIG. 12 with flow control orifices at 49 to provide flow regulation of back wash port G and rinse port H. The flow control device 58 is a passage shown in FIG. 3 and FIG. 12 and connects sections AA and BB. The passage may be elastomeric to vary the flow in relation to the pressure of the stream. In FIG. 12 backwash control valve 44 and manifold 46 may be omitted. Port H may be plugged.

Figure 12B:
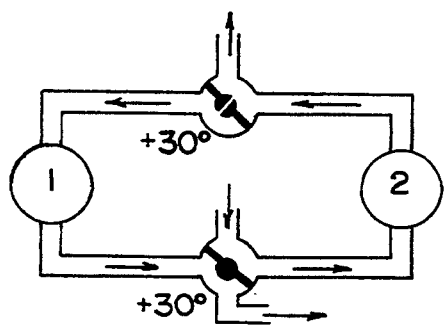
Figure 12C:
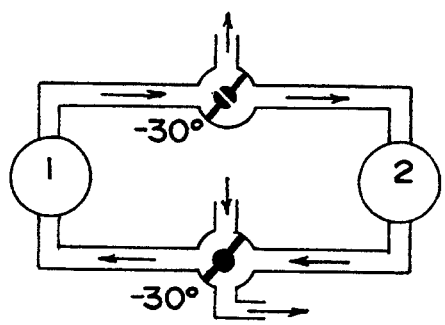

In this set up, only three operational steps are needed to complete a backwash cycle for both tanks. The rinse steps are omitted. FIG. 12B shows a +30° rotation of both diverters to connect TIP C to waste port G, and main outlet connects to TOP E via orifice 58 which regulates a portion of main outlet flow to supply water for back wash of first tank. By reversing diverter positions to −30° in FIG. 12C, the same result is achieved for filter tank two. Turn back to 0° and both filters resume on line filter operation in 12A.

Figures 9, 10:
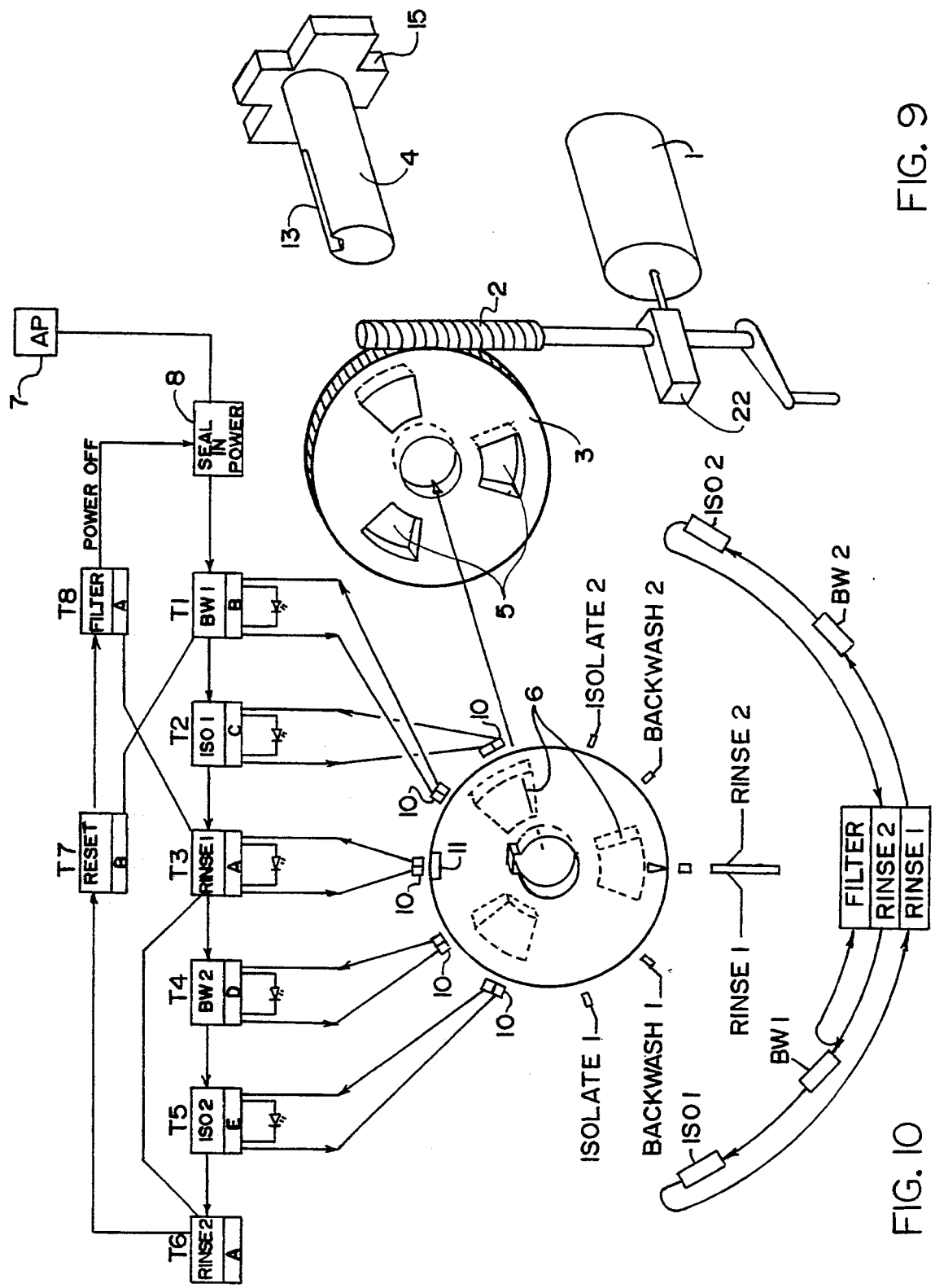
FIG. 9 Drive means for valves.
FIG. 10 Control knob.

The controller is shown in FIGS. 9 and 10. The controller may be operated by a timer that determines which modes should be performed. The controller controls the movement of the diverter valves by rotating them the necessary increment to reconnect the passages as needed. The control may be by a motor in connection with the right angle drive 22. This drive turns a worm gear 2. The apertures 5 engage with the lugs 6 on the control knob 7, see FIG. 3. The control knob is keyed to the coupling shaft at 13 in FIG. 9. The spring 9 presses against the control knob to insure that the lugs remain engaged with the apertures. Cruciform shape 15 allows coupling shaft 13 to removably engage inlet diverter to allow for controller removal without valve disassembly.

In the preferred method of operation, the timer may go up to eight steps to alternately backwash, isolate and rinse each of the tanks. Yet another means of initiation may be of a timed interval on a daily basis.

A direct manual means may be used to over ride the automatic control if needed. The control knob may be pulled out for manual operation. This disengages the lugs from the drive gear so that the control knob may be turned by hand. Alternate manual method allows valve operation by hand crank which directly drives the worm gear. Other means may be used to drive the diverter valves.

To initiate the automatic steps the controller may be activated by a differential pressure sensor (DP) that can determine when a filter in one of the tanks is clogged. The DP sensor senses the summation of filter drop across both tanks. This sensor control can be used in addition to the automatic control or may be used on its own.

I claim:

1. A dual tank flow diverting system comprising: a valve block having upper and lower surfaces, front and back surfaces and left and right surfaces, said block having an internal passage in connection with said front and back surfaces, a main inlet passage and a main outlet passage, said passages connecting said upper wall with said internal passage, a left exit passage connecting said left wall and said internal passage, a left inlet passage connecting said left wall with said internal passage, a right inlet passage connecting said right wall with said internal passages and a right exit passage connecting said right wall with said internal passage, and two outlet passages connecting said bottom wall with said internal passage, a first diverter valve fixed for rotation within said internal passage and having a removed portion for fluid connection with said left inlet passage, said right inlet passage and said main inlet passage, a second diverter valve fixed for rotation within said internal passage and having a removed portion for fluid connection with said left exit passage, said right exit passage and said main outlet passage; said first diverter valve having a second removed portion extending about 135° around said first diverter valve.

2. The apparatus of claim 1 where said second diverter valve has a second removed portion extending about 135° around said second diverter valve.

3. The apparatus of claim 1 wherein said second diverter valve has a central passage in connection with said first and around said second removed portions.

4. The apparatus of claim 1 wherein one of said diverters has at least one lug extending therefrom and the other of said diverters has at least one aperture adapted to engage said lug so that said diverters may be controlled by a single means for rotation.

5. The apparatus of claim 1 wherein one of said secondary outlet passages is in connection with a flow control means, and one of said diverters is in connection with a means to operate said flow control means upon rotation of said diverter so that said flow control means may be operated by rotation of said diverter.

6. The apparatus of claim 1 wherein said secondary outlet passages are both in connection with a common outlet passage.

* * * * *